United States Patent
Anderseck et al.

(10) Patent No.: US 9,499,091 B2
(45) Date of Patent: Nov. 22, 2016

(54) ASSEMBLY FOR FORMING AN AIR-GUIDING ELEMENT FOR A MOTOR VEHICLE

(71) Applicant: REHAU AG + Co, Rehau (DE)

(72) Inventors: Bennet Anderseck, Hof (DE); Christian Wolff, Hof (DE); Paul Kirchgesner, Oberkotzau (DE); Joerg Kammerer, Wunsiedel (DE)

(73) Assignee: Rehau AG & Co, Rehau (DE)

( * ) Notice: Subject to any disclaimer, the term of this patent is extended or adjusted under 35 U.S.C. 154(b) by 82 days.

(21) Appl. No.: 14/405,158

(22) PCT Filed: May 16, 2013

(86) PCT No.: PCT/EP2013/001447
§ 371 (c)(1),
(2) Date: Dec. 3, 2014

(87) PCT Pub. No.: WO2014/005660
PCT Pub. Date: Jan. 9, 2014

(65) Prior Publication Data
US 2015/0117049 A1    Apr. 30, 2015

(30) Foreign Application Priority Data
Jun. 5, 2012  (DE) .................. 20 2012 102 063 U

(51) Int. Cl.
*B60Q 1/26*  (2006.01)
*B60Q 1/44*  (2006.01)
(Continued)

(52) U.S. Cl.
CPC ........... *B60Q 1/2661* (2013.01); *B60Q 1/2638* (2013.01); *B60Q 1/302* (2013.01); *B60Q 1/44* (2013.01); *B62D 35/007* (2013.01)

(58) Field of Classification Search
CPC .... B60Q 1/26; B60Q 1/2619; B60Q 1/2623; B60Q 1/2661; B60Q 1/30; B60Q 1/302; B62D 35/007
USPC ............................................ 296/180.1, 180.2
See application file for complete search history.

(56) References Cited

U.S. PATENT DOCUMENTS

| 4,845,600 | A | 7/1989 | Matsumura et al. |
| 5,923,245 | A * | 7/1999 | Klatt .............. B60Q 1/302 180/68.3 |

(Continued)

FOREIGN PATENT DOCUMENTS

| CN | 101643094 A | 2/2010 |
| DE | 40 03 569 A1 | 8/1990 |

(Continued)

OTHER PUBLICATIONS

International patent application No. PCT/EP2013/001447, International Search Report, Jan. 9, 2014.

*Primary Examiner* — Jason S Daniels
(74) *Attorney, Agent, or Firm* — Da Vinci Partners LLC; John Moettell

(57) ABSTRACT

An assembly for forming an air-guiding element for a motor vehicle has a shell-shaped air-guiding body and a brake lamp. The air-guiding body has an elongated opening which extends through the air-guiding body. The air-guiding body portion is arranged below the brake lamp. The retention side of the air-guiding body portion faces toward the retention side of the brake lamp. Both the brake light and the spoiler include mating retention elements which are both hook shaped to hold the lamp in position.

26 Claims, 3 Drawing Sheets

(51) Int. Cl.
*B60Q 1/30* (2006.01)
*B62D 35/00* (2006.01)

(56) References Cited

U.S. PATENT DOCUMENTS 7,878,577 B2 * 2/2011 Thomas ............... B62D 35/007
296/180.1
2010/0026045 A1 2/2010 Thomas

FOREIGN PATENT DOCUMENTS

| DE | 196 52 692 C1 | 6/1996 |
| DE | 10 2009 009455 A1 | 8/2010 |
| EP | 1 083 099 A1 | 3/2001 |
| JP | S61 160331 A | 7/1986 |
| JP | S63130342 U | 8/1988 |
| JP | S6416939 U | 1/1989 |

* cited by examiner

ASSEMBLY FOR FORMING AN AIR-GUIDING ELEMENT FOR A MOTOR VEHICLE

CROSS REFERENCE TO RELATED APPLICATIONS

This application is the National Stage of International Application No. PCT/EP2013/001447, filed May 16, 2013, which claims benefit under 35 USC §119(a), to German patent application Ser. No. 20 2012 102 063.7, filed Jun. 5, 2012.

BACKGROUND OF THE INVENTION

The present invention relates to an assembly for forming an air-guiding element for use with a motor vehicle.

It is known to design air-guiding elements or air-guiding devices for motor vehicles as air-guiding elements having an integrated brake lamp. Assemblies provided to produce or form such air-guiding elements comprise a shell-shaped air-guiding body to optimize the air flow during driving, the body generally being made of a polymer material, and the brake lamp. The air-guiding bodies generally have a flat design as thin-walled injection-molded bodies having wall thicknesses within a range of 2 mm to 4 mm. Air-guiding bodies having thicker wall thicknesses cannot be injection-molded at all, or only with considerable loss of quality. Based on these structural specifications, it is necessary to retain the air-guiding body, in particular, also on the brake lamp that is connected to the motor vehicle, so as to prevent the air-guiding body from fluttering or deforming, in particular during driving, as a result of flow forces of the air flow in the surroundings of the air-guiding body. Measures to increase the inherent rigidity of the air-guiding body, such as ribbing, are difficult or even impossible to implement due to the structural specifications.

In the known solutions, usually retaining means, in particular screws, which extends through the thin-walled air-guiding body, are used to retain the air-guiding body on the brake lamp that is attached to the car body. This type of connection is not only quite complex to implement, but is also very prone to tearing of the air-guiding body material in the area of the screw extending through the air-guiding body material due to the thin-walled design. Additionally, the outer appearance is adversely affected and results in a lower-quality impression of corresponding air-guiding elements.

The air-guiding bodies of known air-guiding elements having an integrated brake lamp typically have an elongated opening which extends through the air-guiding body and which is closed off by the light emitting surface of the brake lamp or in which the light emitting surface of the brake lamp is accommodated. As a result, the use of retaining means extending through the air-guiding body material is problematic in the region of the air-guiding element that is visible from the outside, in particular, in close vicinity of the light emitting surface, also with regard to a visually appealing design of the air-guiding element. The primary reason for this is that these retaining means are difficult to recess in the air-guiding body material due to the thin-walled design of the air-guiding body, and consequently remain visible from the outside.

Underlying Problem

Compared to the known solutions, it is the object of the present invention to provide an alternative assembly for forming an air-guiding element for a motor vehicle, which allows the air-guiding body to be retained on the brake lamp in a simple and practical manner.

Solution According to the Invention

This object is achieved according to the invention by an assembly for forming an air-guiding element for a motor vehicle having the features of claim 1.

Contrary to the known solutions, in which retaining means, in particular screws, extending through the thin-walled air-guiding body, are typically used to retain the air-guiding body on the brake lamp, the use of the assembly according to the invention advantageously allows this type of mounting to be dispensed with.

Contrary to the known solutions, at least one retention element is integrally formed on a retention side of an air-guiding body portion of the air-guiding body, and at least one counterpart retention element is integrally formed on a retention side of the brake lamp, and; furthermore, the retention element can be retained on the counterpart retention element so as to retain the air-guiding body on the brake lamp in the predetermined brake lamp position. With the use of the retention element and the counterpart retention element, it is advantageously possible to easily and practically retain the air-guiding body, in particular the air-guiding body portion, on the brake lamp. In particular, permanent fixation of the position of the air-guiding body relative to the brake lamp is possible in this way.

The air-guiding body has an elongated opening which extends through the air-guiding body or an opening which extends through the air-guiding body. So as to form or produce the air-guiding element, the elongated opening can be closed off or visually closed off at least in regions or entirely by a light emitting surface of the brake lamp, by arranging the brake lamp in a predetermined brake lamp position.

In the predetermined brake lamp position, the brake lamp is, moreover, enclosed at least in regions or entirely by the air-guiding body, and, in the connected state of the air-guiding element and the motor vehicle, the air-guiding body portion is arranged below the brake lamp and the retention side of the air-guiding body portion faces toward the retention side of the brake lamp. Based on this design provided according to the invention, it is advantageously possible according to the invention to retain the air-guiding body, in particular the air-guiding body portion, on the brake lamp in a way that is not visible from the outside where the air-guiding element is connected to the motor vehicle. Known complex retaining or connecting via retaining means extending through the air-guiding body, such as screws, which interfere with the outer visual appearance, can advantageously be dispensed with. This type of retention or connection is very prone to tearing of the air-guiding body material in the area of the retaining means extending through the air-guiding body material as a result of the thin-walled design of the air-guiding body.

In particular in close vicinity of the light emitting surface of the brake lamp, the use of retaining means extending through the air-guiding body material is problematic with regard to a visually appealing design of the air-guiding element. The primary reason for this is that these retaining means are difficult to recess in the air-guiding body material due to the thin-walled design of the air-guiding body, and, consequently, remain visible from the outside when the air-guiding element is attached to the motor vehicle in the intended position thereof. In contrast, advantageously, an air-guiding element that is visually very appealing from the outside and has an integrated brake lamp can be provided by using the assembly according to the invention where the air-guiding element is connected to the motor vehicle. In particular, a defined gap between the air-guiding body portion and the light emitting surface of the brake lamp can be easily implemented by way of the assembly according to the invention, since the retention element can be retained on the counterpart retention element so as to retain the air-guiding body or the air-guiding body portion on the brake lamp in the predetermined brake lamp position. In particular, a uniform gap or a uniform joint pattern can be provided between the light emitting surface of the brake lamp and the air-guiding body, and more particularly advantageously, a uniform gap or a uniform joint pattern having tolerances of preferably less than 0.5 mm. Usually only injection-molded air-guiding bodies can be advantageously used as air-guiding bodies to achieve as low a weight as possible, however, they can only be injection-molded without any significant loss of quality in a maximum wall thickness of 2 mm to 4 mm. A uniform gap or a uniform joint pattern is therefore often not possible, or possible only with high complexity, when using retaining means that penetrate the air-guiding body, and more particularly due to the deformation processes of the thin-walled air-guiding body material caused by the use of the retaining means. Deformation or bending of the air-guiding body for retention on the brake lamp, which is inevitable with the known solutions, can thus advantageously be almost entirely avoided through the use of the assembly according to the invention.

By using the assembly according to the invention, the complex integral joining of the air-guiding body to the brake lamp by way of an adhesive can also be advantageously dispensed with.

In a preferred embodiment, both the retention element and the counterpart retention element have a hook-shaped design, wherein the counterpart retention element and the retention element can be hooked into each other so as to retain the air-guiding body on the brake lamp in the predetermined brake lamp position.

By providing a hook-shaped design of the retention element and of the counterpart retention element, the air-guiding body can be retained on the brake lamp in a very simple and practical manner by simply hooking them into each other. Particularly advantageously, the hook-shaped design of the retention element and of the counterpart retention element also allows precise guidance or positioning of the air-guiding body portion, on which the at least one retention element is integrally formed, to be implemented, whereby in particular, a very uniform gap or a very uniform joint pattern between the light emitting surface of the brake lamp and the air-guiding body can be implemented by simply hooking them into each other.

Particularly preferably, the retention element and the counterpart retention element can be hooked into each other by sliding the brake lamp in a displacement direction that is oriented toward the elongated opening, and they can be unhooked from each other by sliding in the direction opposite the displacement direction. An assembly according to this particularly preferred embodiment allows the assembly to be very easily assembled into the air-guiding element on the respective motor vehicle. For example, it is particularly practical that the air-guiding body can be initially attached to the motor vehicle. Thereafter, the brake lamp is brought into the predetermined brake lamp position by sliding in the displacement direction directed toward the elongate opening, wherein as a result of the sliding, the air-guiding body can also be retained on the brake lamp by them being hooked into each other. The brake lamp itself can be attached to the motor vehicle even after being hooked to the body. Since the retention element and the counterpart retention element can also be unhooked from each other by sliding in the direction opposite the displacement direction, the brake lamp can advantageously be removed in a simple and practical manner, for example for maintenance, without having to entirely disassemble the air-guiding element from the motor vehicle.

In one practical embodiment, the distance between the retention side of the brake lamp and the retention side of the air-guiding body portion in the region of the counterpart retention element and of the retention element is within a range of 2 mm to 15 mm, preferably within a range of 3 mm to 13 mm, further preferably within a range of 4 mm to 12 mm, further preferably within a range of 5 mm to 9 mm, and further preferably within a range of 6 mm to 8 mm, when they are retained against each other, or when the brake lamp is in the predetermined brake lamp position. In this way, a visually appealing design of the region of the air-guiding element that is visible from the outside is possible, in particular in close vicinity of the light emitting surface of the brake lamp, and, this design can, in particular, also advantageously be adapted to the flow requirements for the air-guiding body, which can preferably be designed in the form of a thin-walled injection-molded body having wall thicknesses within a range of 2 mm to 4 mm.

In a further practical embodiment, the brake lamp is provided with an attachment means for attaching the brake lamp to the motor vehicle. By providing the attachment means on the brake lamp, the installation or the attachment of the brake lamp can advantageously be facilitated—in particular after the elongated opening has been closed off at least in regions or completely by the light emitting surface.

The air-guiding body can preferably be made of an injection-moldable plastic material. Particularly, preferably, the air-guiding body and/or the brake lamp can be made at least partially or entirely of ABS, or at least partially or entirely of a blended material comprising PC (abbreviation for polycarbonate) and ABS (abbreviation for alkyl benzene sulfonates), or at least partially or entirely of a blended material comprising PC (abbreviation for polycarbonate) and PET (abbreviation for polyethylene terephthalate), or at least partially or entirely of a blended material comprising PC (abbreviation for polycarbonate) and PBT (abbreviation for polybutylene terephthalate), or at least partially or entirely of a blended material comprising PP (abbreviation for polypropylene) and EPDM (abbreviation for ethylene propylene diene monomer rubber), wherein the all of the aforementioned materials can be provided with at least one further filler (in particular a mineral and/or talc filler).

The air-guiding body is particularly preferably designed to produce or form a rear spoiler element having an integrated brake lamp, or a roof edge rear spoiler element having an integrated brake lamp in the form of a rear spoiler or in the form of a roof edge rear spoiler.

BRIEF DESCRIPTION OF THE DRAWINGS

An exemplary embodiment of the invention will be described in more detail hereafter based on the accompanying drawings. In the drawings.

Figure 1:
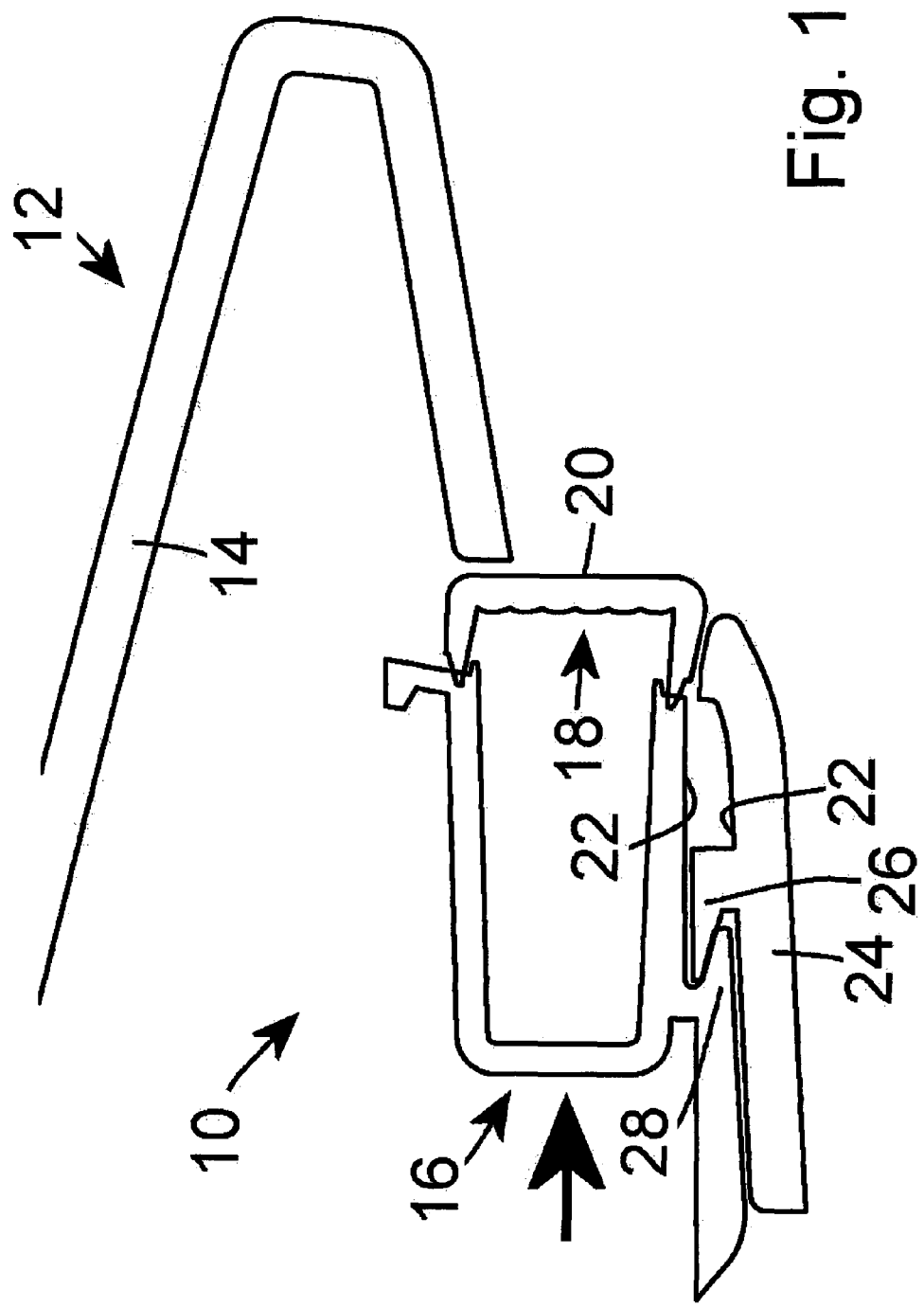
FIG. 1 shows a schematic sectional view of an exemplary embodiment of an assembly according to the invention.

The assembly 10 according to the invention for forming an air-guiding element 12 for a motor vehicle shown in a sectional illustration in FIG. 1 comprises a shell-shaped air-guiding body 14 and a brake lamp 16. The air-guiding body 14 is designed in the form of a roof edge rear spoiler 14.

The air-guiding body 14 has an elongated opening 18 that extends through the air-guiding body 14 (see also FIG. 3) and has a longitudinal axis, which is oriented perpendicular or substantially perpendicularly to the longitudinal direction of the motor vehicle in the connected state to the respective motor vehicle (not shown). The air-guiding body 14 is moreover an injection-molded body, or a thin-walled injection-molded body, having a wall thickness of 3 mm to 3.5 mm.

Figure 2:
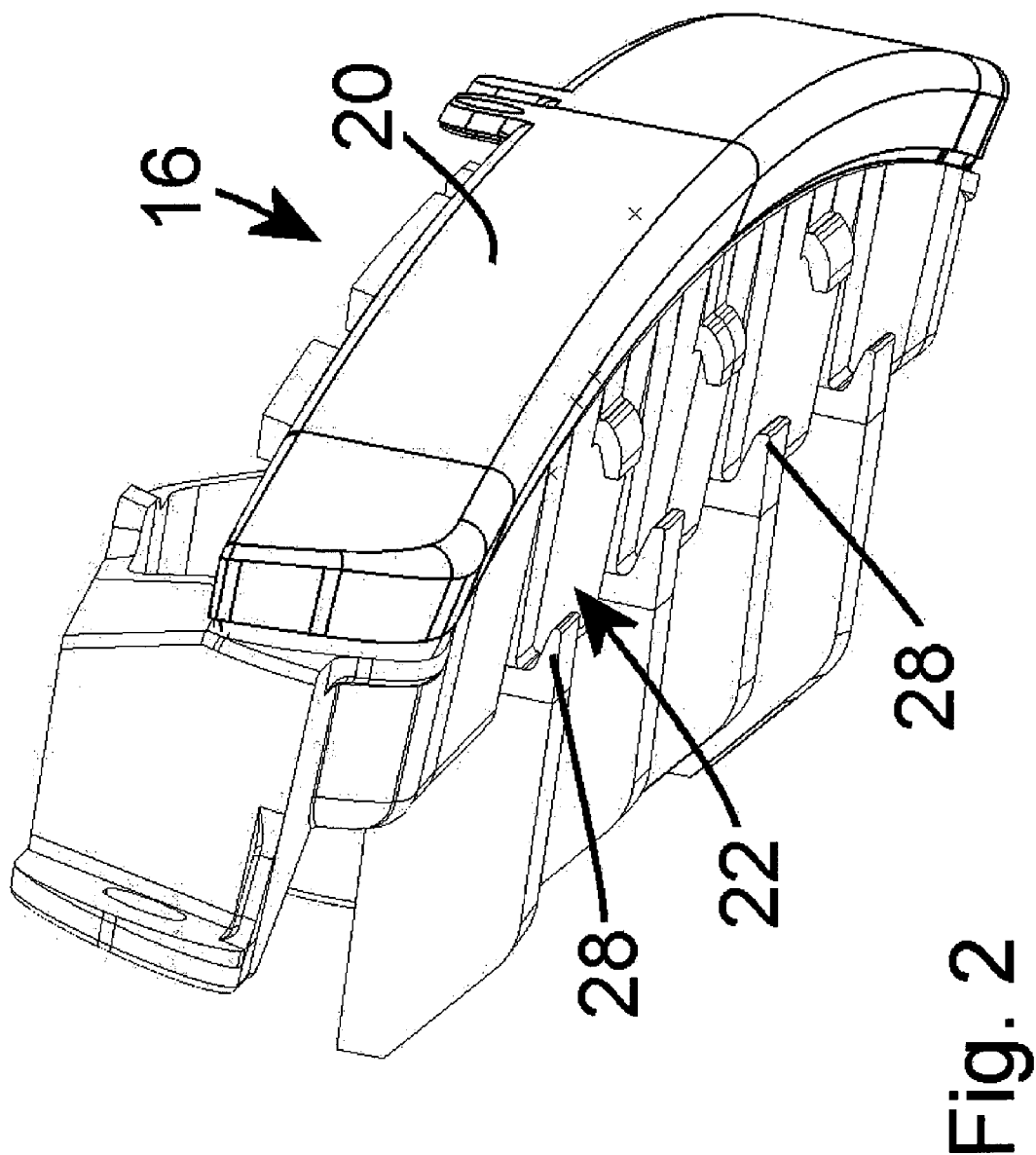
FIG. 2 shows a three-dimensional illustration of the brake lamp of the assembly shown schematically in FIG. 1; and, FIG. 3 shows a three-dimensional partial illustration of the air-guiding body of the assembly shown schematically in FIG. 1.

FIG. 1 illustrates the situation in which the elongated opening 18 is closed off in some regions by a light emitting surface 20 (see also FIG. 2) of the brake lamp 16, wherein the brake lamp 16 is disposed in a predetermined brake lamp position for this purpose, in which the brake lamp 16 is enclosed in some regions by the air-guiding body 14. As a result of the elongated opening 18 being closed off in some regions by the light emitting surface, an air-guiding element 12 having an integrated brake lamp 16 is formed of the air-guiding body 14 and the brake lamp 16.

Figure 3:
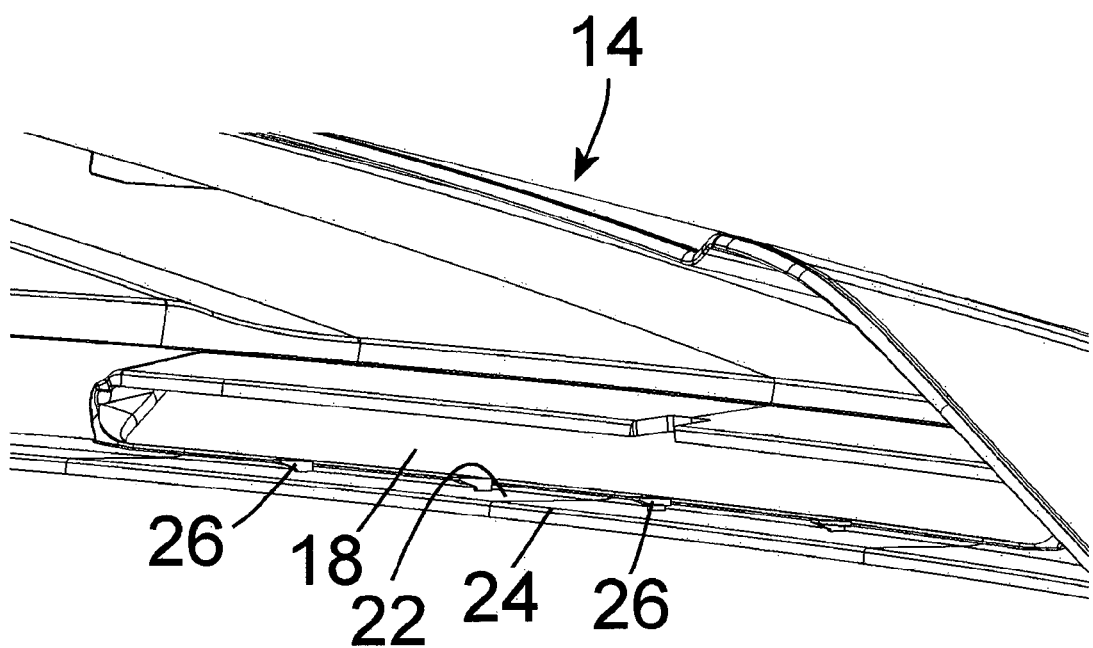

As is apparent from FIG. 3, four mutually spaced retention elements 26 are integrally formed on a retention side 22 of an air-guiding body portion 24 of the air-guiding body 14, wherein the sectional view in FIG. 1 shows only one retention element 26. As is apparent from FIG. 2, moreover four counterpart retention elements 28 are integrally formed on a retention side 22 of the brake lamp 16, wherein the sectional view in FIG. 1 shows only one counterpart retention element 28. A respective retention element 26 can be retained in each case on one counterpart retention element 28 so as to retain the air-guiding body 14 on the brake lamp 16 in the predetermined brake lamp position. In total, four retention element/counterpart retention element pairs are thus provided for retaining the air-guiding body 14 on the brake lamp 16. In the connected state of the air-guiding element 12 and the motor vehicle, the air-guiding body portion 24 is arranged below the brake lamp 16, and the retention side 22 of the air-guiding body portion 24 faces toward the retention side 22 of the brake lamp 16.

Both the retention element 26 and the counterpart retention element 28 have a hook-shaped design, and the counterpart retention element 28 and the retention element 26 can be hooked into each other so as to retain the air-guiding body 14 on the brake lamp 16 in the predetermined brake lamp position. In a particularly installation-friendly manner, the retention element 26 and the counterpart retention element 28 can be hooked into each other by sliding, or manually sliding, the brake lamp 16 in a displacement direction that is oriented toward the elongate opening 18 (see also corresponding arrow in FIG. 1), and they can be unhooked from each other by sliding, or manual sliding, in the direction opposite the displacement direction.

In the state illustrated in FIG. 1, in which the air-guiding body 14 is retained on the brake lamp 16—or when the brake lamp 16 is in the predetermined brake lamp position—the distance between the retention side 22 of the brake lamp 16 and the retention side 22 of the air-guiding body portion 24 in the region of the counterpart retention element 28 and of the retention element 26 is approximately 8 mm and is thus within a range of 3 mm to 10 mm. By providing such a small distance, which deviates only slightly from the wall thickness of the air-guiding body 14, a visually appealing design of the region of the air-guiding element 12 that is visible from the outside is possible, in particular in close vicinity of the light emitting surface 20 of the brake lamp 16, this design in particular also advantageously being adaptable to the flow requirements for the air-guiding body 14.

The invention claimed is:

1. An assembly for forming an air-guiding element for a motor vehicle, comprising a shell-shaped air-guiding body and a brake lamp,
    wherein the air-guiding body has an elongated opening which extends through the air-guiding body;
    so as to form the air-guiding element, the elongated opening can be closed off at least in regions by a light emitting surface of the brake lamp by disposing the brake lamp in a predetermined brake lamp position, wherein in the predetermined brake lamp position, the brake lamp is enclosed at least in regions by the air-guiding body;
    wherein at least one retention element is integrally formed on a retention side of an air-guiding body portion of the air-guiding body, and at least one counterpart retention element is integrally formed on a retention side of the brake lamp;
    wherein the retention element can be retained on the counterpart retention element so as to retain the air-guiding body on the brake lamp in the predetermined brake lamp position; and
    wherein, in the connected state of the air-guiding element and the motor vehicle, the air-guiding body portion is arranged below the brake lamp, and the retention side of the air-guiding body portion faces toward the retention side of the brake lamp, wherein both the retention element and the counterpart retention element have a hook-shaped design, the counterpart retention element and the retention element can be hooked into each other so as to retain the air-guiding body on the brake lamp in the predetermined brake lamp position.

2. The assembly according to claim 1, wherein the retention element and the counterpart retention element can be hooked into each other by sliding the brake lamp in a displacement direction that is oriented toward the elongate opening, and they can be unhooked from each other by sliding in a direction opposite the displacement direction.

3. An assembly according to claim 2, wherein the distance between the retention side of the brake lamp and the retention side of the air-guiding body portion in the region of the counterpart retention element and of the retention element is within a range of 2 mm to 15 mm, when they are retained against each other.

4. An assembly according to claim 2, wherein the brake lamp is provided with an attachment means for attaching the brake lamp to the motor vehicle.

5. An assembly according to claim 2, wherein the air-guiding body is made at least partially of ABS and/or that the brake lamp is made at least partially of a blended material comprising PC and ABS.

6. An assembly according to claim 2, wherein the air-guiding body is designed in the form of a rear spoiler, or in the form of a roof edge rear spoiler.

7. An assembly according to claim 2, wherein the distance between the retention side of the brake lamp and the retention side of the air-guiding body portion in the region of the counterpart retention element and of the retention element is within a range of 3 mm to 13 mm, when they are retained against each other.

8. An assembly according to claim 2, wherein the distance between the retention side of the brake lamp and the retention side of the air-guiding body portion in the region of the counterpart retention element and of the retention element is within a range of 4 mm to 12 mm, when they are retained against each other.

9. An assembly according to claim 2, wherein the distance between the retention side of the brake lamp and the retention side of the air-guiding body portion in the region of the counterpart retention element and of the retention element is within a range 5 mm to 9 mm, when they are retained against each other.

10. An assembly according to claim 2, wherein the distance between the retention side of the brake lamp and the retention side of the air-guiding body portion in the region of the counterpart retention element and of the retention element is within a range of 6 mm to 8 mm, when they are retained against each other.

11. An assembly according to claim 1, wherein the distance between the retention side of the brake lamp and the retention side of the air-guiding body portion in the region of the counterpart retention element and of the retention element is within a range of 2 mm to 15 mm, when they are retained against each other.

12. An assembly according to claim 11, wherein the brake lamp is provided with an attachment means for attaching the brake lamp to the motor vehicle.

13. An assembly according to claim 11, wherein the air-guiding body is made at least partially of ABS and/or that the brake lamp is made at least partially of a blended material comprising PC and ABS.

14. An assembly according to claim 11, wherein the air-guiding body is designed in the form of a rear spoiler, or in the form of a roof edge rear spoiler.

15. An assembly according to claim 1, wherein the brake lamp is provided with an attachment means for attaching the brake lamp to the motor vehicle.

16. An assembly according to claim 15, wherein the air-guiding body is made at least partially of ABS and/or that the brake lamp is made at least partially of a blended material comprising PC and ABS.

17. An assembly according to claim 15, wherein the air-guiding body is designed in the form of a rear spoiler, or in the form of a roof edge rear spoiler.

18. An assembly according to claim 1, wherein the air-guiding body is made at least partially of ABS and/or that the brake lamp is made at least partially of a blended material comprising PC and ABS.

19. An assembly according to claim 1, wherein the air-guiding body is designed in the form of a rear spoiler, or in the form of a roof edge rear spoiler.

20. An assembly according to claim 1, wherein the brake lamp is provided with an attachment means for attaching the brake lamp to the motor vehicle.

21. An assembly according to claim 1, wherein the air-guiding body is made at least partially of ABS and/or that the brake lamp is made at least partially of a blended material comprising PC and ABS.

22. An assembly according to claim 1, wherein the air-guiding body is designed in the form of a rear spoiler, or in the form of a roof edge rear spoiler.

23. An assembly according to claim 1, wherein the distance between the retention side of the brake lamp and the retention side of the air-guiding body portion in the region of the counterpart retention element and of the retention element is within a range of 3 mm to 13 mm, when they are retained against each other.

24. An assembly according to claim 1, wherein the distance between the retention side of the brake lamp and the retention side of the air-guiding body portion in the region of the counterpart retention element and of the retention element is within a range of 4 mm to 12 mm, when they are retained against each other.

25. An assembly according to claim 1, wherein the distance between the retention side of the brake lamp and the retention side of the air-guiding body portion in the region of the counterpart retention element and of the retention element is within a range 5 mm to 9 mm, when they are retained against each other.

26. An assembly according to claim 1, wherein the distance between the retention side of the brake lamp and the retention side of the air-guiding body portion in the region of the counterpart retention element and of the retention element is within a range of 6 mm to 8 mm, when they are retained against each other.

* * * * *